US012717916B2

(12) United States Patent
Chung

(10) Patent No.: US 12,717,916 B2
(45) Date of Patent: Aug. 25, 2026

(54) DETECTION METHOD AND DETECTION SYSTEM FOR RANSOMWARE

(71) Applicant: DELTA ELECTRONICS, INC., Taoyuan City (TW)

(72) Inventor: Shen-Ming Chung, Taoyuan City (TW)

( * ) Notice: Subject to any disclaimer, the term of this patent is extended or adjusted under 35 U.S.C. 154(b) by 404 days.

(21) Appl. No.: 18/382,458

(22) Filed: Oct. 20, 2023

(65) Prior Publication Data

US 2024/0362328 A1 Oct. 31, 2024

Related U.S. Application Data

(60) Provisional application No. 63/461,837, filed on Apr. 25, 2023.

(51) Int. Cl.
*G06F 21/56* (2013.01)
*G06F 21/55* (2013.01)

(52) U.S. Cl.
CPC .......... *G06F 21/565* (2013.01); *G06F 21/554* (2013.01); *G06F 21/568* (2013.01)

(58) Field of Classification Search
None
See application file for complete search history.

(56) References Cited

U.S. PATENT DOCUMENTS 11,113,152 B1 9/2021 Jha et al.
2018/0018458 A1* 1/2018 Schmugar ............ G06F 21/554
2019/0228153 A1 7/2019 Scaife et al.
2021/0056204 A1 2/2021 Singh et al.
2021/0092130 A1* 3/2021 Li ......................... G06F 21/563

FOREIGN PATENT DOCUMENTS

CN 101894236 A 11/2010
CN 107403096 A 11/2017

OTHER PUBLICATIONS

Scaife et al. Title: "CryptoLock (and Drop It): Stopping Ransomeware Attacks on User Data", IEEE 2016 (Year: 2016).*
Search Report dated Jan. 23, 2024 of the corresponding PCT patent application No. PCT/CN2023/132565.
Search Report dated Apr. 9, 2024 of the corresponding European patent application No. 23204792.8.

* cited by examiner

*Primary Examiner* — Farid Homayounmehr
*Assistant Examiner* — Suman Debnath
(74) *Attorney, Agent, or Firm* — HDLS IPR SERVICES; Chun-Ming Shih

(57) ABSTRACT

A detection method for ransomware collaborated with a detection system having a semantic extracting module with multiple semantic extractors is disclosed and includes following steps: receiving a first file with a first ID; importing the first file to the semantic extracting module to output a first semantic feature of the first file; receiving a second file with a second ID; importing the second file to the semantic extracting module to output a second semantic feature of the second file; computing a distance between the first semantic feature and the second semantic feature if the second ID matches the first ID; and, issuing an alarm when the distance exceeds a threshold.

20 Claims, 6 Drawing Sheets

DETECTION METHOD AND DETECTION SYSTEM FOR RANSOMWARE

CROSS-REFERENCE TO RELATED APPLICATION

This patent application claims the benefit of U.S. Provisional Patent Application No. 63/461,837, filed on Apr. 25, 2023, which is incorporated by reference herein.

BACKGROUND OF THE DISCLOSURE

Technical Field

The disclosure relates to a detection method and a detection system, and particularly to a detection method and a detection system for ransomware.

Description of Related Art

In recent times, the threat of ransomware has been rapidly increasing across various industries. Despite the development of numerous cybersecurity tools and services aimed at countering this menace, ransomware attacks have continued to escalate at an alarming rate and showing no sign of decline. Small and medium enterprises (SMEs) are particularly vulnerable to ransomware due to their flat network structures and simplistic access control policies, making them prime targets for cybercriminals.

Unlike large enterprises, SMEs usually lack the resources to implement complex and expensive cybersecurity solutions, and, therefore, desire simple and affordable measures to safeguard their computer systems. Compared to more complex and expensive combinations of security measures such as advanced firewalls, next-generation antivirus software, intrusion detection system, and application whitelisting, backup solutions are relatively simple and offer a cost-effective and straightforward approach to data protection. Therefore, backup solutions have been considered essential tools for SMEs to recover from disasters.

However, when backing up files, traditional backup solutions cannot determine whether the files have already been corrupted by malware, such as ransomware. Specifically, if a backup solution cannot distinguish between uncorrupted files (also known as clean files) and corrupted files (also known as unclean files), it will unwittingly back up everything, resulting in backup snapshots that mix clean and unclean files. When the number of snapshots is limited, traditional backup solutions often delete the oldest version of a file (which may be clean) to make room for a new but possibly unclean version. In the event of a malware attack, this action can render all available backup snapshots useless when needed. Even if a backup solution allows unlimited snapshots, it can still become a nightmare for file owners who must undertake a manual and often painful restoration process to retrieve clean versions from numerous backup snapshots.

In sum, traditional backup solutions fall short in protecting against ransomware attacks if there is no effective ransomware detection method incorporated within.

SUMMARY OF THE DISCLOSURE

The present disclosure discloses a ransomware detection method and a ransomware detection system that determine whether a file is under attack by detecting substantial changes in at least one semantic feature of the file, wherein a semantic feature of a file is an extracted feature that tells the difference of a file from another based on file content. In the following, exemplary embodiments are provided to disclose the features that can be extracted from files and used as semantic features. These exemplary embodiments are presented for explanatory purposes and should not be considered as limitations to this invention.

In one of the exemplary embodiments, the ransomware detection method described in this disclosure includes the following steps:

a) receiving a first file having a first ID;

b) importing the first file into a semantic extracting module having multiple semantic extractors, and outputting a first semantic feature of the first fie by the semantic extracting module;

c) receiving a second file having a second ID;

d) importing the second file into the semantic extracting module and outputting a second semantic feature of the second file by the semantic extracting module;

e) determining whether the first ID matches with the second ID;

f) confirming that the first file and the second file are different versions of same file and computing a distance between the first semantic feature and the second semantic feature if the first ID matches with the second ID; and g) issuing a warning when the distance exceeds a threshold.

In one of the exemplary embodiments, the ransomware detection system of the present disclosure includes:

a file importing module, configured to receive a first file having a first ID and a second file having a second ID;

a semantic extracting module connecting with the file importing module, having multiple semantic extractors, and configured to extract a first semantic feature of the first file and a second semantic feature of the second file;

a comparing module connecting with the semantic extracting module, configured to determine whether the first ID matches with the second ID, confirm that the first file and the second file are different versions of same file and compute a distance between the first semantic feature and the second semantic feature if the first ID matches with the second ID; and a warning module connecting with the comparing module, configured to issue a warning when the comparing module determines that the distance exceeds a threshold.

The present disclosure inspects at least one semantic feature in a previous version of a file as well as a subsequent version of the file to determine whether the file is a clean (not-corrupted) or unclean (corrupted) version, so as to detect the presence of ransomware. Compared with related arts, the present disclosure enables a backup solution to tag each backup file version with a status of clean or unclean, and therefore, to ensure that there is always at least one clean version of each backup file for restoration when needed, in order to effectively counter ransomware attacks.

DETAILED DESCRIPTION

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The common technical solutions for ransomware detection include the following categories: (1) monitoring for abnormal file operations: (2) monitoring for abnormal file entropy: (3) observing metadata of a file: (4) combination of the above. However, category (1) is not effective against ransomware that erodes files at a slow rate, category (2), though based on file content, easily produces false alarms as some existing file types are of high entropy intrinsically, and category (3) cannot detect ransomware attacks if ransomware does not corrupt the metadata of a file to cause harm.

The present disclosure offers an innovative method and system to detect ransomware, including types that traditional solutions are hardly or unable to detect. Being able to effectively determine whether a file is clean or corrupted by ransomware (that is, unclean), the present disclosure significantly improves the ability of a corresponding backup solution or backup system to preserve clean versions of each backup file, reducing the likelihood of having to pay ransom in the event of a ransomware attack.

Statistical data reveals that nearly all types of ransomware cause substantial semantic changes to the content of victim files, fulfilling their purpose of extorting ransom for file restoration. As a response, the present disclosure involves a method and a system that compare the semantic changes in file content between the previous and subsequent versions. This approach effectively identifies the existence of ransomware, regardless of its potential evolution.

Figure 1:
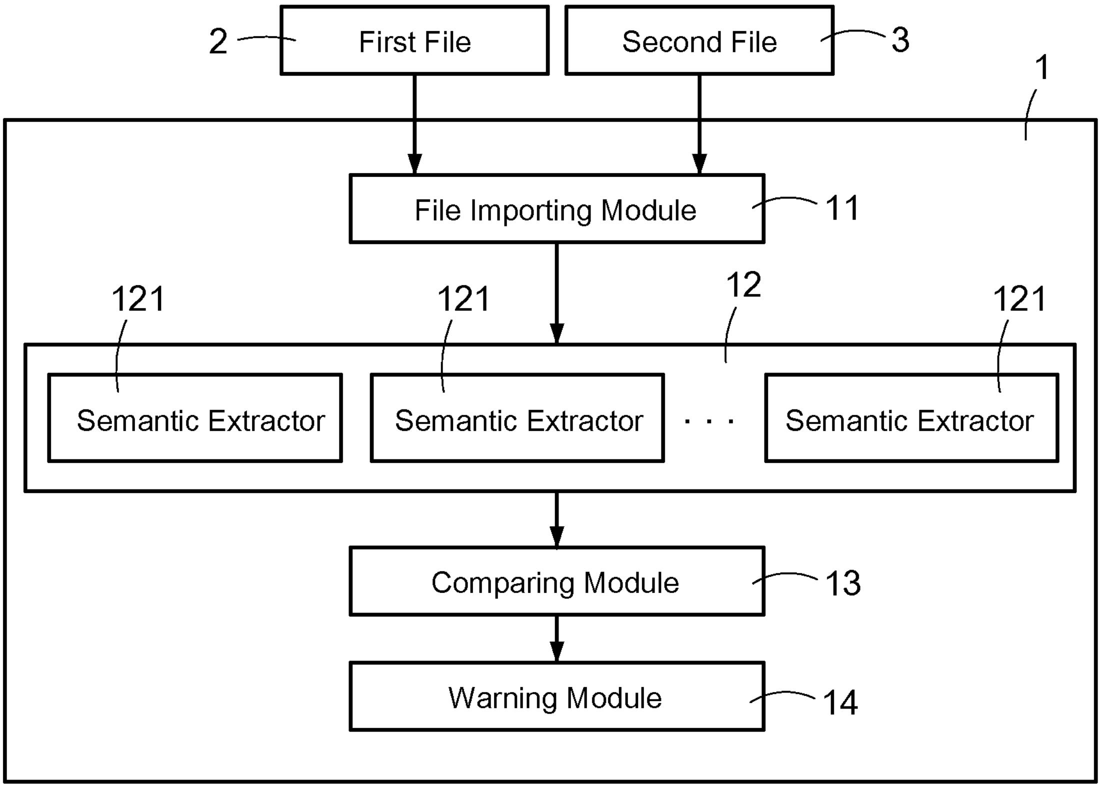
FIG. 1 is a schematic diagram of a detection system of one embodiment according to the present disclosure.

Please refer to FIG. 1, which is a schematic diagram of a detection system of one embodiment according to the present disclosure. As shown in FIG. 1, the detection system 1 of the present disclosure includes a file importing module 11, a semantic extracting module 12, a comparing module 13, and a warning module 14, wherein the semantic extracting module 12 is connected with the file importing module 11, the comparing module 13 is connected with the semantic extracting module 12, and the warning module 14 is connected with the comparing module 13.

In one embodiment, the detection system 1 is implemented by software or firmware that runs in individual hardware. For example, a computing device or a server in the computer environment having a processor may be used to run the detection system 1 of the present disclosure, therefore, the computing device may detect whether the files provided or ran by the computing device are attacked by ransomware, and the server may detect whether the files being backed up are attacked by ransomware. In the embodiment, the file importing module 11, the semantic extracting module 12, the comparing module 13, and the warning module 14 are software modules implemented by program codes.

In one embodiment, the detection system 1 receives a first file 2 through the file importing module 11, wherein the first file 2 has an identifiable first ID. After receiving the first file 2, the detection system 1 analyzes the first file 2 through the semantic extracting module 12 to extract a first semantic feature of the first file 2.

In one embodiment, the semantic extracting module 12 includes multiple semantic extractors 121. After receiving the first file 2 from the file importing module 11, the semantic extracting module 12 inputs the first file 2 to the multiple semantic extractors 121 for analysis, and each of the semantic extractors 121 may respectively output a result. Next, the semantic extracting module 12 combines the multiple results from the multiple semantic extractors 121 to obtain the first semantic feature of the first file 2.

In the present disclosure, each of the semantic extractors 121 may be implemented by a different type of extractor to analyze multiple types of files, including but not limited to text files, picture files, audio files and video files, and, to extract at least one semantic feature therefrom (detailed discussed in the following).

In one embodiment, the detection system 1 further receives a second file 3 having an identifiable second ID through the file importing module 11 and analyzes the second file 3 through the semantic extracting module 12 to extract a second semantic feature of the second file 3.

If the second file 3 and the first file 2 are a subsequent version and a previous version of same file, the detection system 1 may compare the difference between the semantic feature of the second file 3 and the semantic feature of the first file 2 to determine whether the subsequent version of file (such as the second file 3) is corrupted by ransomware. Before comparing, the detection system 1 checks whether the second file 3 and the first file 2 are the subsequent version and the previous version of same file.

In one embodiment, the comparing module 13 first determines whether the first ID of the first file 2 matches with the second ID of the second file 3 and confirms that the first file 2 and the second file 3 are previous version and subsequent version of same file if the first ID matches with the second ID. It should be mentioned that ransomware may or may not tamper the filename of the files while attacking, in the present disclosure, such matching could mean identical, similar, conform to a specific rule, or different with a difference less than a threshold, etc.

Therefore, the first ID may be the filename or the metadata of the first file 2 and the second ID may be the filename or the metadata of the second file 3. In a first embodiment, the comparing module 13 determines that the first ID matches with the second ID when the filename of the first file 2 is identical to the filename of the second file 3. In a second embodiment, the comparing module 13 determines that the first ID matches with the second ID when the hamming distance between the filename of the first file 2 and the filename of the second file 3 is close. In a third embodiment, the comparing module 13 determines that the first ID matches with the second ID when the metadata of the first file 2 is close to the metadata of the second file 3. In these embodiments, the filename may be a full-path filename which refers to the complete and specific location of a file within a file system. In Windows systems, it includes the drive letter (e.g., C:), directory (folder) names, and the filename itself. In Unix-like systems, it includes the root character (/), directory (folder) names, and the filename itself.

However, the above description is only a part of the embodiments of the present disclosure, and the detection system 1 is not restricted to use the above solutions to determine whether a first file 2 and a second file 3 are different versions of same file.

After determining that the first ID matches with the second ID, the comparing module 13 further computes a distance between the first semantic feature of the first file 2 and the second semantic feature of the second file 3. A zero or small distance indicates that the content of the first file 2 and the content of the second file 3 are identical or have undergone moderately changes, which is consistent with typical editing trace. In such cases, the detection system 1 confirms that the subsequent version of file (i.e., the second file 3) has not been attacked by ransomware.

If the previously mentioned distance exceeds a preset threshold, it indicates a substantial and abnormal change in the content of the first file 2 and the content of the second file 3. In this case, the detection system 1 asserts that the subsequent version of file (i.e., the second file 3) has been attacked by ransomware. In this disclosure, the detection system 1 utilizes the warning module 14 to issue a warning once the comparing module 13 determines that the distance exceeds the preset threshold.

In this disclosure, the detection system 1 may analyze every version of each file. If the warning module 14 does not issue a warning for a subsequent version of a file, the detection system 1 (or a backup server) may label it as a clean version. Conversely, if the warning module 14 does issue a warning, the detection system 1 (or the backup server) may label it as an unclean version.

Figure 2:
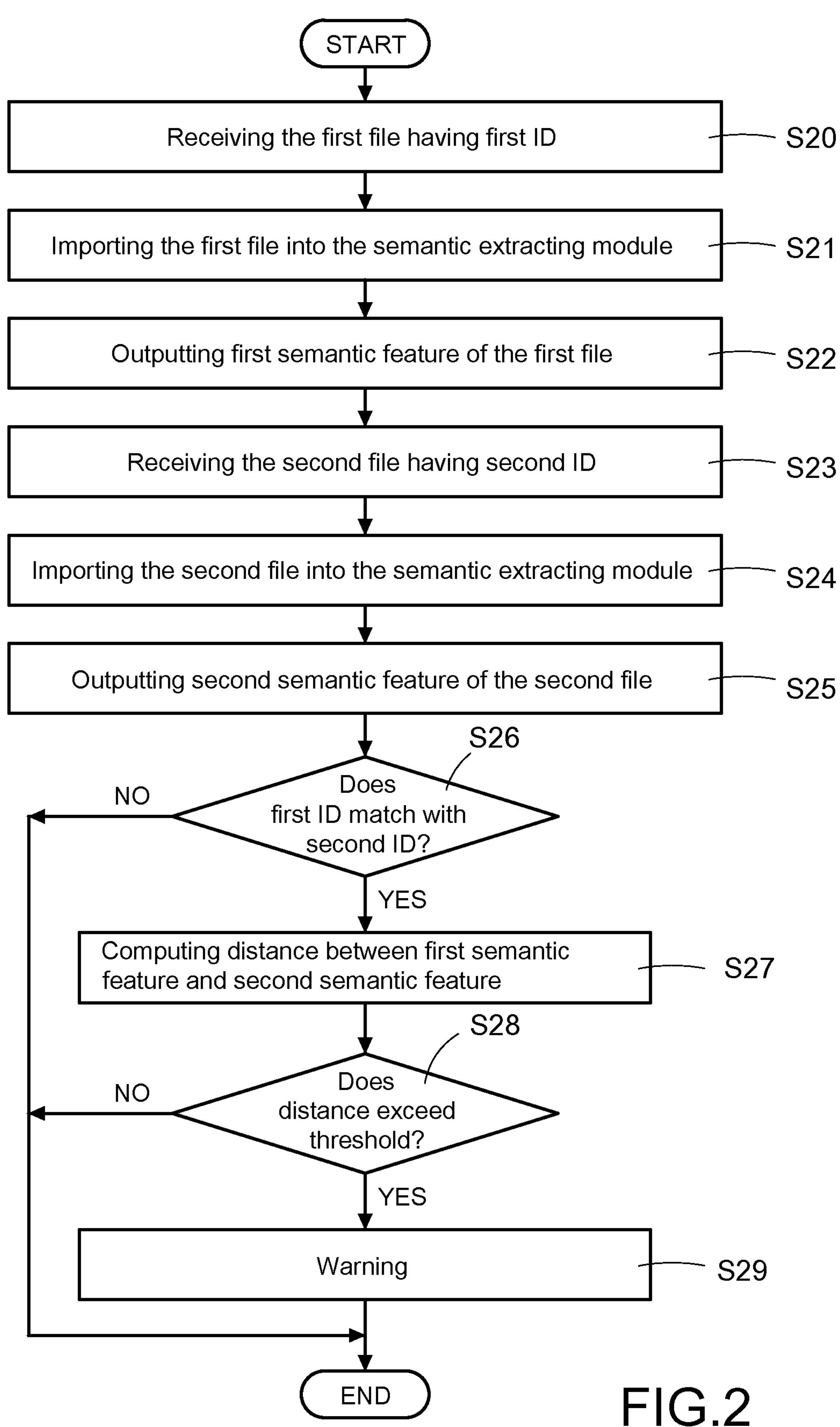
FIG. 2 is a flowchart of a detection method of one embodiment according to the present disclosure.

Please refer to FIG. 2, which is a flowchart of a detection method of one embodiment according to the present disclosure. FIG. 2 discloses a detection method of the present disclosure, and the detection method is incorporated with the detection system 1 as disclosed in FIG. 1.

As shown in FIG. 2, the detection method of the present disclosure first receives the first file 2 having the first ID by the detection system 1 (step S20), then imports the first file 2 into the semantic extracting module 12 (step S21), and then outputs the first semantic feature of the first file 2 based on the results of the multiple semantic extractors 121 of the semantic extracting module 12 (step S22).

Also, the detection method receives the second file 3 having the second ID by the detection system 1 (step S23), imports the second file 3 into the semantic extracting module 12 (step S24), and then outputs the second semantic feature of the second file 3 based on the results of the multiple semantic extractors 121 of the semantic extracting module 12 (step S25).

Next, the detection system 1 determines whether the first ID of the first file 2 matches with the second ID of the second file 3 (step S26). If the first ID and the second ID does not match with each other, it indicates that the first file 2 and the second file 3 are not a previous version and a subsequent version of same file. In this case, the detection system 1 does not compare the semantic feature of the first file 2 with the semantic feature of the second file 3.

If the first ID and the second ID match with each other, the detection system 1 confirms that the first file 2 and the second file 3 are a previous version and a subsequent version of same file, wherein the first file 2 is a previous version while the second file 3 is a subsequent version. Then, the detection system 1 further computes a distance between the first semantic feature of the first file 2 and the second semantic feature of the second file 3 (step S27). Also, the detection system 1 determines if the distance computed in the step S27 exceeds a preset threshold (step S28), and issues a warning for the second file 3 when the distance is determined to exceed the threshold (step S29).

In one embodiment, the warning is issued to label the second file 3 as an unclean file, indicating that it has been corrupted by ransomware.

In the present disclosure, the detection system 1 uses the comparing module 13 to execute a distance function to compute the distance between the first semantic feature and the second semantic feature. In one embodiment, the semantic features are in form of vector, and the detection system 1 may calculate L1-norm, L2-norm, or other similar metric and output the result as the distance between the first semantic feature and the second semantic feature, but not limited thereto.

In the present disclosure, according to different contents or different types of files (such as the first file 2 and the second file 3), the detection system 1 may use different semantic extractors 121 to implement the semantic extracting module 12 to extract semantic features from files to compare with each other.

In one embodiment, the multiple semantic extractors 121 include different deep neural networks (DNNs). The semantic extracting module 12 uses the DNNs to extract features in form of vector from the contents of the first file 2 and the second file 3, and respectively output the extracted features as the first semantic feature of the first file 2 and the second semantic feature of the second file 3. Using DNNs as an extractor is effective when the first file 2 and second file 3 are picture files, video files and audio files.

In one embodiment, the semantic extractors 121 may include different types of DNN, including but not limited to convolutional neural networks (CNNs), recurrent neural networks (RNNs), and Feedforward Neural Networks (FNN). Also, the multiple semantic extractors 121 in the semantic extracting module 12 may include a combination of these networks.

It should be mentioned that the purpose of generating the semantic features of the present disclosure is to assert whether a substantial change happens in the contents of a previous version and a subsequent version of same file. In other words, as long as a significant change of the file contents can be evaluated and compared, it is unnecessary for the detection system 1 to generate the semantic features that are interpretable by humans.

Let's consider a DNN with fifty hidden layers as an example, wherein a human-interpretable semantic feature of a file can be obtained after the file is processed through the entire fifty layers of the DNN. In this DNN, even though the output generated after passing through the first twenty layers of the DNN may not be intelligible to humans, detection system 1 can still utilize this output to evaluate and compare whether a substantial change exists between the contents of the previous version and the subsequent version of the file. In some embodiments, by reducing the number of DNN layers used for semantic feature extracting, the overall processing speed can be improved.

In one embodiment, the multiple semantic extractors 121 include different language analytical tools. In the embodiment, the semantic extracting module 12 uses the language analytical tools to transform the contents of the first file 2 and the second file 3 into textual summaries, and then regards the textual summaries as the first semantic feature of the first file 2 and the second semantic feature of the second file 3.

In one embodiment, the language analytical tools may be, for example but not limited to, ChatGPT released by Open AI, Bard released by Google, Stanford CoreNLP, Amazon Comprehend, natural language toolkit (NLTK), and etc.

For example, the detection system 1 imports the first file 2 and the second file 3 into the language analytical tools used by the semantic extracting module 12 along with a query such as "please use ten adjectives to describe the content of the file". Therefore, the language analytical tools may respectively analyze the file content according to the command and generate the textual summaries, and the detection system 1 may regard the textual summaries as the first semantic feature and the second semantic feature and determine whether the second file 3 is an unclean file based on the semantic distance between the first semantic feature and the second semantic feature.

It should be mentioned that different language analytical tools may generate same or similar semantic features for same file, but the semantic features given by different language analytical tools may include multiple synonyms. In this embodiment, when determining the distance between the first semantic feature and the second semantic feature, the detection system 1 may perform the determination based on the number of synonyms being lost between the first semantic feature and the second semantic feature.

For example, the first semantic feature includes three words which are "sad", "serene", and "hopeless" while the second semantic feature includes another three words which are "glad", "quiet", and "touching". Because no synonyms for "sad" and "hopeless" can be found in the second semantic feature, the detection system 1 may determine that the distance between the first semantic feature and the second semantic feature is 2 ("quiet" in the second semantic feature can be found as a synonym of "serene" in the first semantic feature).

It should be mentioned that, in one embodiment, the semantic extracting module 12 may use the combination of the aforementioned DNNs and language analytical tools to implement the multiple semantic extractors 121 in the semantic extracting module 12, it is not restricted in only one type of the semantic extractor 121.

In one embodiment, the multiple semantic extractors 121 include different file parsers. In the embodiment, the semantic extracting module 12 uses the file parsers to parse the first file 2 and the second file 3. If the first file 2 can be successfully parsed by at least one of the file parsers while the second file 3 cannot, the detection system 1 may determine that the second file 3 is attacked by ransomware to become an unclean file.

Figure 3:
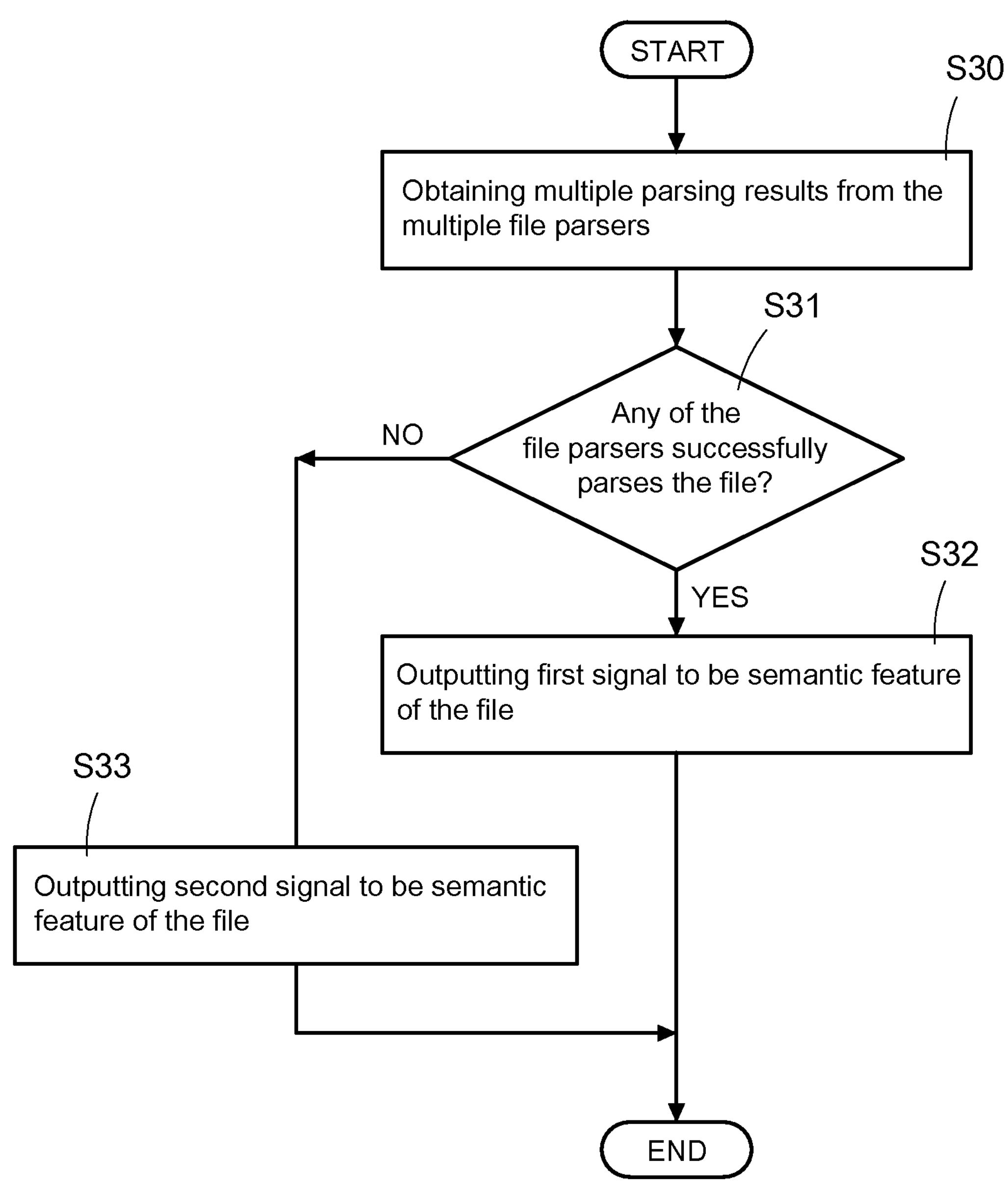
FIG. 3 is a flowchart for extracting a semantic feature of one embodiment according to the present disclosure.

Please refer to FIG. 3, which is a flowchart for extracting a semantic feature in one embodiment according to the present disclosure. FIG. 3 is used to illustrate how the semantic extracting module 12 of the present disclosure uses multiple different file parsers to generate the semantic feature of the files. It is essential to acknowledge that relying solely on checking file extension is not a dependable method for determining if a file is attached by malware, such as ransomware, because ransomware can corrupt the file content without touching the file name and its extension. Using file parsers can not only check if the file content structure is distorted but also determine the file type. In other words, as each file parser analyzes file content against a known file structure, such a semantic feature is useful against a kind of ransomware that cannot help but corrupts the file structure while corrupting the file content.

As shown in FIG. 3, after importing the file (including the first file 2 and/or the second file 3) into the file parsers, the semantic extracting module 12 may obtain multiple parsing results from the file parsers (step S30). Next, the semantic extracting module 12 determines if any of the file parsers can successfully parse this file (step S31). If at least one of the file parsers can successfully parse this file, the semantic extracting module 12 outputs a first signal to be the semantic feature of this file (step S32). If none of the file parsers can successfully parse this file, the semantic extracting module 12 outputs a second signal to be the semantic feature of this file (step S33).

In one embodiment, the first signal is different from the second signal. For example, in one embodiment, the first signal is 1 and the second signal is 0. In another embodiment, the first signal is 0 and the second signal is 1.

The embodiment in FIG. 3 may also be applied to the embodiment in FIG. 2. For example, if at least one of the file parsers can successfully parse the first file 2, the semantic extracting module 12 outputs a first signal to be the first semantic feature of the first file 2; if none of the file parsers can successfully parse the first file 2, the semantic extracting module 12 outputs a second signal to be the first semantic feature of the first file 2. Similarly, if at least one of the file parsers can successfully parse the second file 3, the semantic extracting module 12 outputs a first signal to be the second semantic feature of the second file 3; if none of the file parsers can successfully parse the second file 3, the semantic extracting module 12 outputs a second signal to be the second semantic feature of the second file 3.

In one exemplary embodiment, as shown in FIG. 3, the semantic feature is directly related to whether the file can be successfully parsed by one or more of the file parsers. More specifically, when the previous version of a file (such as the first file 2) can be successfully parsed by one or more of the file parsers while the subsequent version of the same file (such as the second file 3) fails to be parsed by any of the file parsers, the detection system 1 may determine that the subsequent version of the file is attacked by ransomware as a substantial change (e.g., file structure is distorted) is detected and label the subsequent version is an unclean version (a corrupted version).

In this embodiment, the semantic extracting module 12 only generates the signal with either 0 or 1 (i.e., the first signal or the second signal), resulting a very low storage requirement to apply the aforementioned technical solution.

Furthermore, applying the above embodiment may also prevent the system from false alarm if the variety of file parsers put in place are not sufficient to cover all possible file types. For example, if a file is not covered by the file parsers being used, neither the previous version of the file nor the subsequent version of the file can be parsed by any of the file parsers. Therefore, the semantic extracting module 12 will output the second signal for both versions of the file, and thus the detection system 1 will not assert unclean simply because of insufficient file parsers put in place, and thus avoids the corresponding false alarm.

In one embodiment, each of the file parsers generates the second signal as an output signal when it cannot successfully parse the file, and the semantic feature outputted by the semantic extracting module 12 is a collection of output signals generated by the file parsers, such as $\{0, 0, 0, \ldots, 0\}$. However, if one of the file parsers can successfully parse the file, it will generate the first signal as the output signal, and the semantic feature outputted by the semantic extracting module 12 may be, for example, {0, 0, 1, . . . , 0}. By comparing the collections of the output signals as semantic feature, the detection system 1 can assert whether a substantial change happens between the two versions of same file.

In another embodiment, the multiple semantic extractors 121 include different file parsers used to parse and extract texts from the content of an input file. For example, each of the file parsers may parse texts from files of a particular file type, such as Word, Excel, or PowerPoint, etc.

In the embodiment, the semantic extracting module 12 uses the file parsers to respectively extract texts from the content of the first file 2 and the second file 3 and generates the first semantic feature and the second semantic feature based on the extracted content texts. Therefore, the detection system 1 may assert whether the second file 3 is attacked by ransomware based on the first semantic feature and the second semantic feature.

Figure 4:
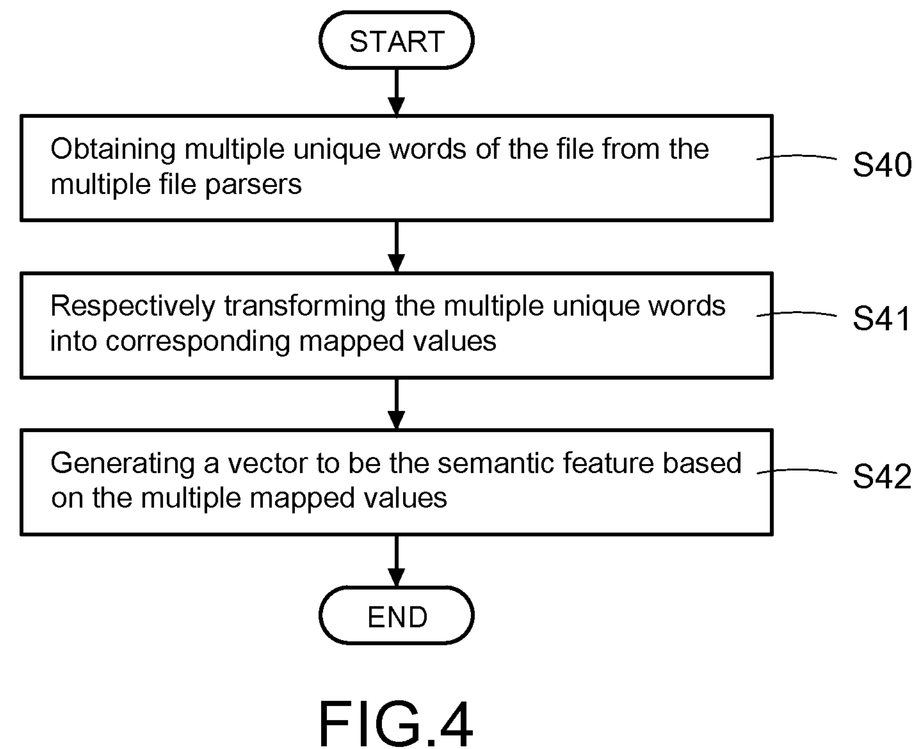
FIG. 4 is a flowchart for extracting a semantic feature of one embodiment according to the present disclosure.

Please refer to FIG. 4, which is a flowchart for extracting a semantic feature in one embodiment according to the present disclosure. FIG. 4 is used to illustrate how the semantic extracting module 12 of the present disclosure generates semantic features through file parsers that are used to extract texts from an input file.

As shown in FIG. 4, after importing a file (including the first file 2 and/or the second file 3) into the file parsers, the semantic extracting module 12 may obtain multiple unique words of the file from the file parsers (step S40). Next, the semantic extracting module 12 respectively transforms the multiple unique words into corresponding mapped values (step S41), and then generates a vector to be the semantic feature based on the multiple mapped values (step S42). In the embodiment, the vector includes multiple entries, and each of the entries respectively corresponds to occurrence count of each mapped value.

Figure 5:
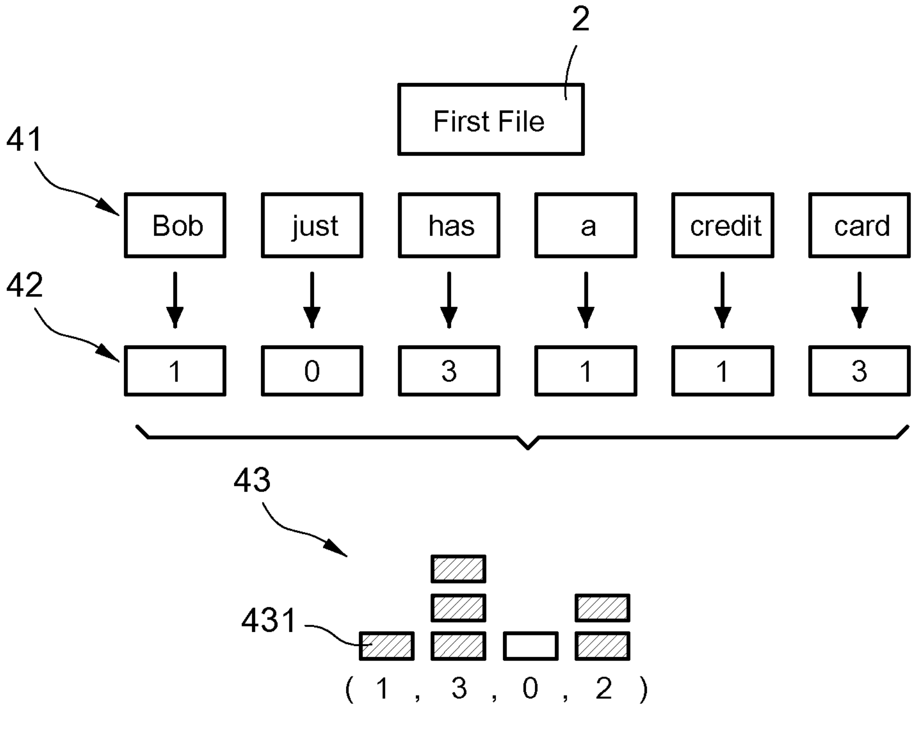
FIG. 5 is a schematic diagram of generating a semantic feature of one embodiment according to the present disclosure.
Figure 6:
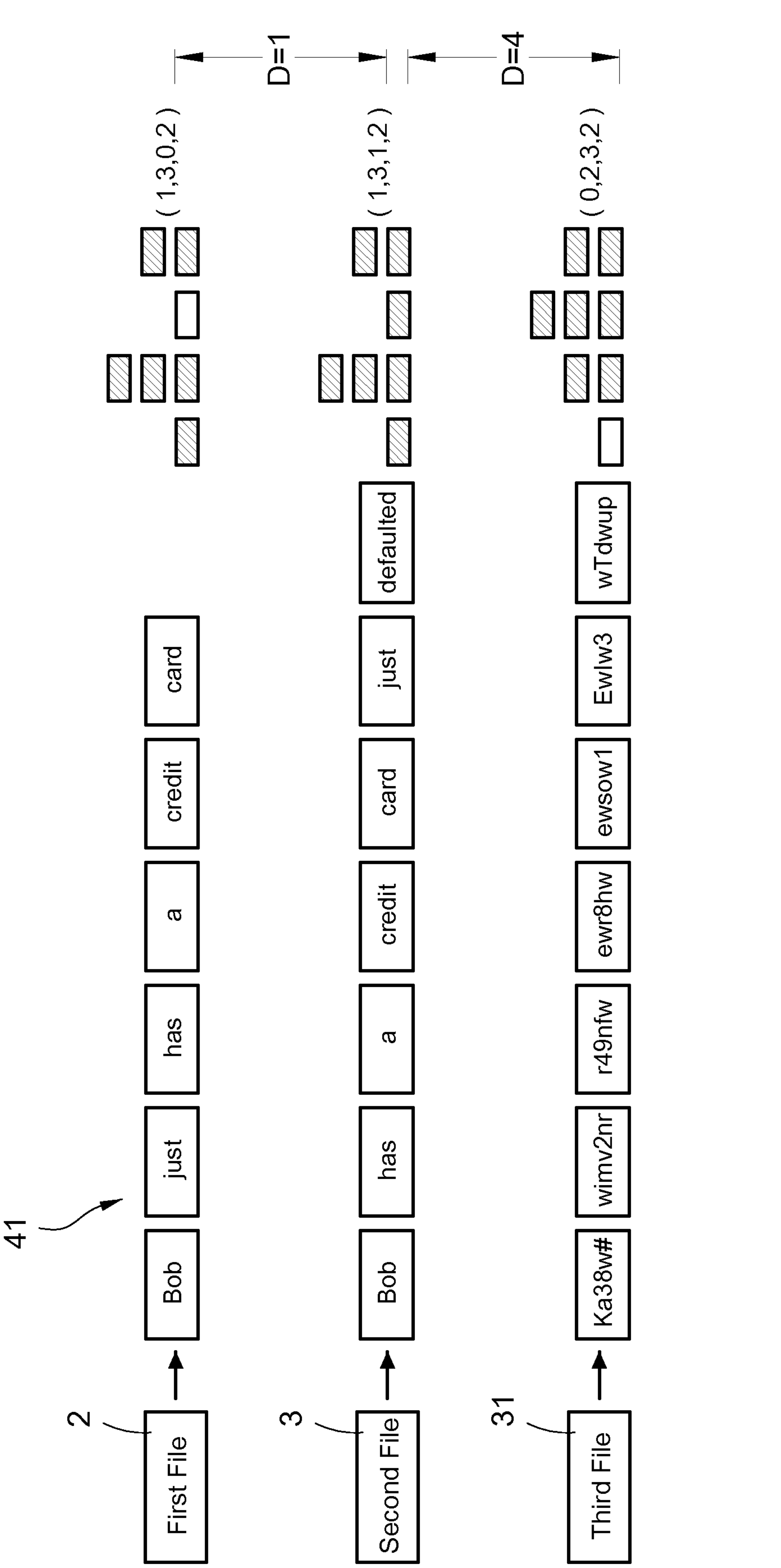
FIG. 6 is a schematic diagram of comparing semantic features of one embodiment according to the present disclosure.

Please refer to FIG. 4, FIG. 5, and FIG. 6 at the same time, wherein FIG. 5 is a schematic diagram of generating a semantic feature in one embodiment according to the present disclosure and FIG. 6 is a schematic diagram of comparing semantic features in one embodiment according to the present disclosure. The embodiment in FIG. 5 uses the first file 2 as an example to illustrate how the semantic extracting module 12 generates the first semantic feature.

As shown in FIG. 5, the detection system 1 imports the first file 2 into the semantic extracting module 12, and the file parsers parse the content of the first file 2 to obtain multiple unique words 41 from the first file 2. It should be mentioned that, as long as there is at least one of the file parsers that can parse the file, texts can be extracted from the file, and thus, unique words can be obtained from the extracted texts.

In one embodiment, each of the unique words 41 refers a word that appears in the first file 2 at least once, and is only preserved once among the unique words 41. In another embodiment, the unique words 41 exclude stop words, such as "and", "or" and "not". Stop words are common words that are often filtered out or ignored when processing natural language text in various text analysis tasks, such as search engines, information retrieval, and text mining. Since these words are generally considered to be of little value in terms of conveying meaningful information, they may be excluded from the unique words 41.

It should be mentioned that the user may preset a parameter setting value for the file parsers. When parsing the content of the first file 2, the file parsers may either parse full content of the first file 2 based on the parameter setting value or only parse a part of the content of the first file 2 (e.g., title, first paragraph, or half of the article, etc.). As an exemplary embodiment, the example shown in FIG. 5 is preset to parse only the first line of text from the first file 2 for illustration and comprehension, but the parsing of the file parsers is not limited to the disclosure of FIG. 5.

In one embodiment, the semantic extracting module 12 transforms each of the unique words 41 into a corresponding mapped value 42 by a hash function, a keyed hash function, loop-up table (LUT), linear feedback shift (LFSR), or modulo sum of ASCII code of each character of the unique word 41.

In the exemplary embodiment, as shown in FIG. 5, after the file parsers parse the first file 2, six unique words 41 of "Bob", "just", "has", "a", "credit", and "card" may be obtained. The semantic extracting module 12 respectively transforms these six unique words 41 into corresponding mapped values 42 of "1", "0", "3", "1", "1", and "3".

In the embodiment, the semantic extracting module 12 may reduce the mapped value 42 being transformed, so the mapped value 42 may not be larger than the length of the vector to be used as a semantic feature.

Taking hash function as an example, the semantic extracting module 12 may use secure hash algorithm (SHA, such as SHA-0, SHA-1, or SHA-256), cyclic redundancy check (CRC, such as CRC-32, CRC-16, or CRC-CCITT), or message digest (MD, such as MD5) to transform the unique words 41 into the corresponding mapped values 42. The mapped values 42 may be reduced if needed.

For example, in the exemplary embodiment, as shown in FIG. 5, the unique words 41 are transformed into simple mapped values 42 (such as 1, 0, 3, 1, 1, and 3 as shown in FIG. 5) for the ease of discussion, but the mapped values 42 of the present disclosure are not limited to the simple way as shown in FIG. 5. For example, if SHA (e.g., SHA-256) is applied for transforming a unique word 41 "HELLO" into a corresponding mapped value 42, corresponding hexadecimal mapped value 42 of "3733cd977ff8eb18b987357e22ced99f46097f31ecb239e87 8ae63760e83e4d5" may be obtained. The above description is only one embodiment of the present disclosure, but not limited thereto.

As another example, in one embodiment, the semantic extracting module 12 may reduce the mapped value 42 being transformed, so the mapped value 42 may be no larger than the length of the vector to be used as a semantic feature. For example, the exemplary hexadecimal value mapped 42 of "3733cd977ff8eb18b987357e22ced99f46097f31ecb239e8 78ae63760e83e4d5" is very large if being interpreted as a value. Therefore, the semantic extracting module 12 may reduce the mapped value 42 by picking only the last 8-bit hexadecimal value, i.e., "d5", to be not larger than a vector of 256-tuple.

Taking cryptographic hash function as another example, the semantic extracting module 12 may apply HMAC-SHA-0, HMAC-SHA-1, HMAC-SHA-256, or HMAC-MD5, etc. to transform the unique words 41 into the corresponding mapped values 42. Since HMAC can map the same unique word into a different hash value given a different key, the semantic feature derived therefrom can offer higher level of privacy protection against adversaries as long as they do not obtain the key.

In one embodiment, the ASCII code of each character of the unique word 41 may be applied to transform each unique word 41 into a corresponding mapped value 42. For example, a unique word 41 "HELLO" can be interpreted as "72", "69", "76", "76", and "79", and the semantic extracting module 12 may accumulate these output values together to obtain a mapped value 42 of "372". In one embodiment, the semantic extracting module 12 performs a modulo operation with a modulus of 256 on the mapped value "372" to obtain "116", to ensure that it remains within the bounds of a vector of 256-tuple.

As shown in FIG. 5, after obtaining the mapped value 42 of each unique word 41, the semantic extracting module 12 further generates a vector 43. The vector 43 includes multiple entries 431, and the value of each entry 431 respectively corresponds to occurrence count of one mapped value 42.

In one exemplary embodiment, as shown in FIG. 5, the mapped values 42 include one "0", three "1", zero "2", and two "3". The multiple entries 431 of the vector 43 generated by the semantic extracting module 12 include a first entry (represents "0") having a value of 1, a second entry (represents "1") having a value of 3, a third entry (represents "2") having a value of 0 (with a white box representing that the entry is empty), and a fourth entry (represents "3") having a value of 2. By regarding this vector 43 as the first semantic feature of the first file 2, the detection system 1 may compare the content of the first file 2 with the content of the subsequent-received second file 3 and determine whether the content of the second file 3 has a substantial change.

In one exemplary embodiment, as shown in FIG. 6, the second file 3 is a subsequent version of the first file 2, though the content of the second file 3 has been edited to have a different meaning, only one unique word 41 "defaulted" is added. After the sematic extracting module 12 transforms the unique words 41 of the second file 3 into the mapped values 42 and generates the vector 43, the comparing module 13 computes the distance D between the vector 43 corresponding to the first file 2 (1,3,0,2) and the vector 43 corresponding to the second file 3 (1,3,1,2) to be 1. In this case, the detection system 1 may determine that the difference between the first file 2 and the second file 3 belongs to a normal editing trace made by a typical user to the second file 3 and label the second file 3 as a clean file.

In one exemplary embodiment, a third file 31 is a subsequent version of the second file 3 and assumed to be corrupted by ransomware. In this example, the file structure of the third file 31 is intentionally not corrupted by ransomware but the texts within are distorted to extort ransom. As a result, as shown in FIG. 6, the content of the third file 31 has a substantial change in comparison with the content of the second file 3. After the semantic extracting module 12 transforms the unique words 41 of the third file 31 into the mapped values 42 and generates the vector 43, the comparing module 13 may compute the distance D between the vector corresponding to the second file 3 (1,3,1,2) and the vector 43 corresponding to the third file 31 (0,2,3,2) to be 4 (which is considered high in this exemplary embodiment). In the case, the detection system 1 may determines that the third file 31 has a substantial change in comparison with the second file 3 and labels the third file 31 as an unclean file.

For the sake of clarity, the embodiments of FIG. 5 and FIG. 6 are exemplified with only 4-tuple vectors 43; however, to improve accuracy, the detection system 1 may use vectors of more tuples. That is, by enlarging the length of the vectors 43, the semantic extracting module 12 may take advantage of more mapped values 42 in the transforming procedure to increase the accuracy of the comparing procedure.

It should be mentioned that if ransomware simply encrypts a file, file parsers cannot parse the file and thus not able to obtain any unique word 41 from the file. In the case, the semantic extracting module 12 generates all mapped values 42 to be 0, and every entry 431 of the vector 43 being generated is also 0. By using the above technical solution, because all entries 431 of the vector 43 of the subsequent version of file are 0, it is a substantial change in comparing with the vector 43 of the previous version of file, so the detection system 1 may determine that the subsequent version of file is attacked by ransomware and becomes an unclean file based on the distance of the vectors.

The embodiment in FIG. 4 can also be applied for the embodiment in FIG. 2. For example, after the first file 2 is imported into the semantic extracting module 12 which include different file parsers, and the semantic extracting module 12 may obtain the multiple unique words 41 of the first file 2 through the results given by the file parsers. After transforming the multiple unique words 41 into the mapped values 42, the semantic extracting module 12 may generate a first vector to be the first semantic feature of the first file 2 based on the multiple mapped values 42, wherein the first vector includes multiple entries where each of the entries respectively corresponds to occurrence count of one of the mapped values 42. After the second file 3 is imported into the semantic extracting module 12 which includes the file parsers, the semantic extracting module 12 may obtain the multiple unique words 41 of the second file 3 through the results given by the file parsers. After transforming the multiple unique words 41 into the mapped values 42, the semantic extracting module 12 may generate a second vector to be the second semantic feature of the second file 3 based on the multiple mapped values 42, wherein the second vector includes multiple entries where each of the entries respectively corresponds to occurrence count of one of the mapped values 42.

By using the above technical solution, even if ransomware manages to tamper only the content of the file without impairing file structure, the detection system 1 of the present disclosure may still detect the incident of ransomware attack.

The detection system 1 of the present disclosure may be applied in an individual computer device and may be also applied in a backup server. The detection system and detection method of the present disclosure may assist the user to detect every version of a file and label each version of the file as clean or unclean. Therefore, even if a backup server backs up an unclean version of a file, when performing system recovering, the backup server may prevent the recovering from using unclean versions of the file based on the labels, but rather using a clean version of the file to achieve effective recovery.

Figure 7:
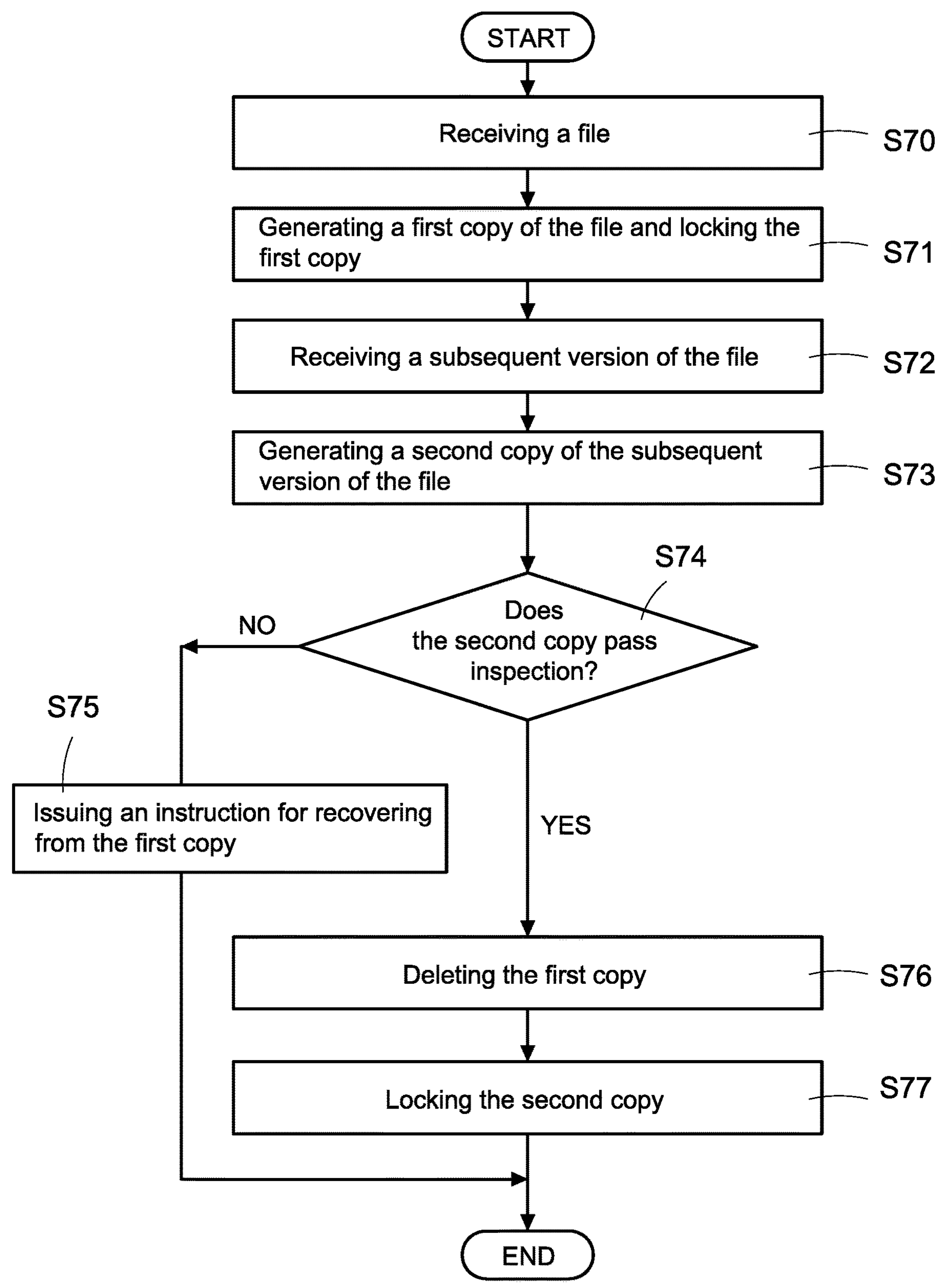
FIG. 7 is a backup flowchart of one embodiment according to the present disclosure.

It is worth noting that the disclosed method may be applied to an individual computer device wherein files are protected with no assistance from any backup server. Please refer to FIG. 7, which is a backup flowchart of one embodiment according to the present disclosure. As disclosed in FIG. 7, a computing device may receive a file when the file is opened (step S70), generate a first copy of this file, and then lock the first copy (step S71). After the first copy is locked, it cannot be edited. In the embodiment, the first copy is corresponding to the first file 2 discussed in the previous embodiment.

When the same file is opened and modified again, the computing device receives a subsequent version of this file (step S72) and generates a second copy of the subsequent version of this file (step S73). In the embodiment, the second copy is corresponding to the second file 3 discussed in the previous embodiment.

In the embodiment, the computing device inspects the first copy and the second copy through the detection system 1 and determines whether the second copy passes the inspection (step S74). If the second copy fails to pass the inspection (i.e., the second copy is warned by the warning module 14 of the detection system 1), the subsequent version of this file is detected as an unclean version, probably as a result of an attack. In this case, the computing device issues an instruction for the user to perform recovering from the first copy (step S75).

If the second copy passes the inspection (i.e., the second copy is not warned by the warning module 14 of the detection system 1), the subsequent version of this file is a clean version. In this case, since the second copy is newer than the first copy, the computing device deletes the first copy (step S76) and locks the second copy (step S77).

If this file is again opened and modified, the computing device may further generate a third copy for the subsequent version of this file, and again repeats the aforementioned inspection. By using the detection system and the detection method of the present disclosure, the computing device may ensure at least a clean version of the file is preserved for recovery when needed.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A detection method for ransomware, comprising:

a) receiving a first file having a first ID;

b) importing the first file into a semantic extracting module comprising multiple semantic extractors, and outputting a first semantic feature of the first file by the semantic extracting module, wherein the multiple semantic extractors comprise different file parsers;

c) receiving a second file having a second ID;

d) importing the second file into the semantic extracting module and outputting a second semantic feature of the second file by the semantic extracting module;

e) determining whether the first ID matches with the second ID;

f) confirming that the first file and the second file are different versions of same file and computing a distance between the first semantic feature and the second semantic feature if the first ID matches with the second ID;

g) issuing a warning when the distance exceeds a threshold, and h) labeling the second file as unclean to prohibit the second file from being used for data recovery:

wherein the step b) comprises:

b1) importing the first file into the file parsers;

b2) outputting a first signal to be the first semantic feature when at least one of the file parsers successfully parses the first file;

b3) outputting a second signal to be the first semantic feature when none of the file parsers successfully parses the first file, wherein the second signal is different from the first signal;

wherein the step d) comprises:

d1) importing the second file into the file parsers;

d2) outputting the first signal to be the second semantic feature when at least one of the file parsers successfully parses the second file; and d3) outputting the second signal to be the second semantic feature when none of the file parsers successfully parses the second file.

2. The detection method in claim 1, wherein the first ID and the second ID are filenames or metadata of the first file and the second file, the step e) comprises one or a combination of the followings: determining that the first ID matches with the second ID when the filename of the first file is identical to the filename of the second file, a hamming distance between the filename of the first file and the filename of the second file is close, the metadata of the first file is close to the metadata of the second file, and, the first file and the second file are placed in same directory and the first file and the second file have a similar filename.

3. The detection method in claim 1, wherein the step f) comprises computing the distance between the first semantic feature and the second semantic feature based on a distance function.

4. The detection method in claim 1, wherein the multiple semantic extractors comprise different deep neural networks (DNNs), and the step b) and the step d) comprise extracting features from the first file and the second file through the DNNs to respectively output multiple features in form of vector to be the first semantic feature and the second semantic feature.

5. The detection method in claim 1, wherein the multiple semantic extractors comprise different language analytical tools, and the step b) and the step d) comprise transforming the content of the first file and the content of the second file into textual summaries through the language analytical tools to be the first semantic feature and the second semantic feature.

6. The detection method in claim 1, further comprising:

l) receiving a file by a computing device when the file is opened and generating a first copy of the file;

m) locking the first copy;

n) receiving a subsequent version of the file by the computing device when the file is opened again, and generating a second copy for the subsequent version of the file;

o) issuing an instruction by the computing device to perform recovering from the first copy if the second copy is warned in the step g); and p) deleting the first copy and locking the second copy by the computing device if the second copy is not warned in the step g).

7. A detection system for ransomware, comprising:

at least one processor; and a storage storing one or more programs configured to be executed by the at least one processor, wherein the one or more programs including instructions for:

receiving a first file having a first ID and a second file having a second ID;

extracting a first semantic feature of the first file and a second semantic feature of the second file through multiple semantic extractors, wherein the multiple semantic extractors comprise different file parsers;

determining whether the first ID matches with the second ID, confirming that the first file and the second file are different versions of same file and compute a distance between the first semantic feature and the second semantic feature if the first ID matches with the second ID;

issuing a warning when determining that the distance exceeds a threshold and labeling the second file as unclean to prohibit the second file from being used for data recovery;

wherein extracting the first semantic feature and the second semantic feature comprising:

outputting a first signal to be the first semantic feature when at least one of the file parsers successfully parses the first file and outputting a second signal to be the first semantic feature when none of the file parsers successfully parses the first file, wherein the second signal is different from the first signal; and outputting the first signal to be the second semantic feature when at least one of the file parsers successfully parses the second file and outputting the second signal to be the second semantic feature when none of the file parsers successfully parses the second file.

8. The detection system of claim 7, wherein the first ID and the second ID are filenames or metadata of the first file and the second file, the one or more programs include instructions for determining that the first ID matches with the second ID if one or a combination of the followings happens: the filename of the first file is identical to the filename of the second file, a hamming distance between the filename of the first file and the filename of the second file is close, the metadata of the first file is close to the metadata of the second file, and, the first file and the second file are placed in same directory and the first file and the second file have a similar filename.

9. The detection system in claim 7, wherein the one or more programs include instructions for computing the distance between the first semantic feature and the second semantic feature based on a distance function.

10. The detection system in claim 7, wherein the multiple semantic extractors comprise different deep neural networks (DNNs), and the one or more programs include instructions for extracting features from the first file and the second file through the DNNs to respectively output multiple features in form of vector to be the first semantic feature and the second semantic feature.

11. The detection system in claim 7, wherein the multiple semantic extractors comprise different language analytical tools, and the one or more programs include instructions for transforming the content of the first file and the content of the second file into textual summaries through the language analytical tools to be the first semantic feature and the second semantic feature.

12. The detection system in claim 7, further comprising a computing device connecting with the detection system, wherein the computing device is configured to execute following actions:

receiving a file when the file is opened, generating a first copy of the file, and locking the first copy;

receiving a subsequent version of the file when the file is opened again and generating a second copy for the subsequent version of the file;

issuing an instruction to perform a recovering from the first copy if the second copy is warned; and deleting the first copy and locking the second copy if the second copy is not warned.

13. A detection method for ransomware, comprising:

a) receiving a first file having a first ID;

b) importing the first file into a semantic extracting module comprising multiple semantic extractors, and outputting a first semantic feature of the first file by the semantic extracting module, wherein the multiple semantic extractors comprise different file parsers to parse textual content out of files;

c) receiving a second file having a second ID;

d) importing the second file into the semantic extracting module and outputting a second semantic feature of the second file by the semantic extracting module;

e) determining whether the first ID matches with the second ID;

f) confirming that the first file and the second file are different versions of same file and computing a distance between the first semantic feature and the second semantic feature if the first ID matches with the second ID;

g) issuing a warning when the distance exceeds a threshold; and h) labeling the second file as unclean to prohibit the second file from being used for data recovery;

wherein the step b) comprises:

b1) importing the first file into the file parsers;

b2) obtaining multiple unique words of the first file based on parsing results given by the file parsers;

b3) respectively transforming each of the unique words into a corresponding mapped value; and b4) generating a first vector to be the first semantic feature based on the multiple mapped values, wherein the first vector comprises multiple entries and each of the entries respectively corresponds to an occurrence count of one of the mapped values;

wherein, the step d) comprises:

d1) importing the second file into the file parsers;

d2) obtaining multiple unique words of the second file based on parsing results given by the file parsers;

d3) respectively transforming each of the unique words of the second file into a corresponding mapped value; and d4) generating a second vector to be the second semantic feature based on the multiple mapped values of the second file, wherein the second vector comprises multiple entries and each of the entries respectively corresponds to an occurrence count of one of the mapped values of the second file.

14. The detection method in claim 13, wherein the step b3) and the step d3) respectively transform each of the unique words into the corresponding mapped value based on one or a combination of the followings: hash function, keyed hash function, look-up table (LUT), linear feedback shift register (LFSR), and modulo sum of American Standard Code for Information Interchange (ASCII) code on each character of the unique words.

15. The detection method in claim 13, wherein the multiple semantic extractors comprise different deep neural networks (DNNs) or different language analytical tools, and the step b) and the step d) comprise extracting features from the first file and the second file through the DNNs to respectively output multiple features in form of vector to be the first semantic feature and the second semantic feature, or transforming the content of the first file and the content of the second file into textual summaries through the language analytical tools to be the first semantic feature and the second semantic feature.

16. The detection method in claim 13, further comprising:

l) receiving a file by a computing device when the file is opened and generating a first copy of the file;

m) locking the first copy;

n) receiving a subsequent version of the file by the computing device when the file is opened again, and generating a second copy for the subsequent version of the file;

o) issuing an instruction by the computing device to perform recovering from the first copy if the second copy is warned in the step g); and p) deleting the first copy and locking the second copy by the computing device if the second copy is not warned in the step g).

17. A detection system for ransomware, comprising:

at least one processor; and a storage storing one or more programs configured to be executed by the at least one processor, wherein the one or more programs including instructions for:

receiving a first file having a first ID and a second file having a second ID;

extracting a first semantic feature of the first file and a second semantic feature of the second file through multiple semantic extractors, wherein the multiple semantic extractors comprise different file parsers to parse textual content out of files;

determining whether the first ID matches with the second ID, confirming that the first file and the second file are different versions of same file and compute a distance between the first semantic feature and the second semantic feature if the first ID matches with the second ID;

issuing a warning when determining that the distance exceeds a threshold; and labeling the second file as unclean to prohibit the second file from being used for data recovery;

wherein extracting the first semantic feature and the second semantic feature comprising:

obtaining multiple unique words of the first file based on parsing results given by the file parsers;

respectively transforming each of the unique words into a corresponding mapped value;

generating a first vector to be the first semantic feature based on the multiple mapped values, wherein the first vector comprises multiple entries and each of the entries respectively corresponds to an occurrence count of one of the mapped values;

obtaining multiple unique words of the second file based on parsing results given by the file parsers;

respectively transforming each of the unique words of the second file into a corresponding mapped value; and generating a second vector to be the second semantic feature based on the multiple mapped values of the second file, wherein the second vector comprises multiple entries and each of the entries respectively corresponds to an occurrence count of one of the mapped values of the second file.

18. The detection system in claim 17, wherein the one or more programs including instructions for respectively transforming each of the unique words into the corresponding mapped value based on one or a combination of the followings: hash function, keyed hash function, look-up table (LUT), linear feedback shift register (LFSR), and rounded-accumulation of American Standard Code for Information Interchange (ASCII) on each character of the unique words.

19. The detection system in claim 17, wherein the multiple semantic extractors comprise different deep neural networks (DNNs) or different language analytical tools, and the one or more programs include instructions for:

extracting features from the first file and the second file through the DNNs to respectively output multiple features in form of vector to be the first semantic feature and the second semantic feature; or transforming the content of the first file and the content of the second file into textual summaries through the language analytical tools to be the first semantic feature and the second semantic feature.

20. The detection system in claim 17, further comprising a computing device connecting with the detection system, wherein the computing device is configured to execute following actions:

receiving a file when the file is opened, generating a first copy of the file, and locking the first copy;

receiving a subsequent version of the file when the file is opened again and generating a second copy for the subsequent version of the file;

issuing an instruction to perform a recovering from the first copy if the second copy is warned; and deleting the first copy and locking the second copy if the second copy is not warned.

* * * * *